Aug. 25, 1959 — R. D. HOFFMAN — 2,900,956
COT FOR DOG AND ANIMAL CAGES
Filed Dec. 19, 1957 — 2 Sheets-Sheet 1
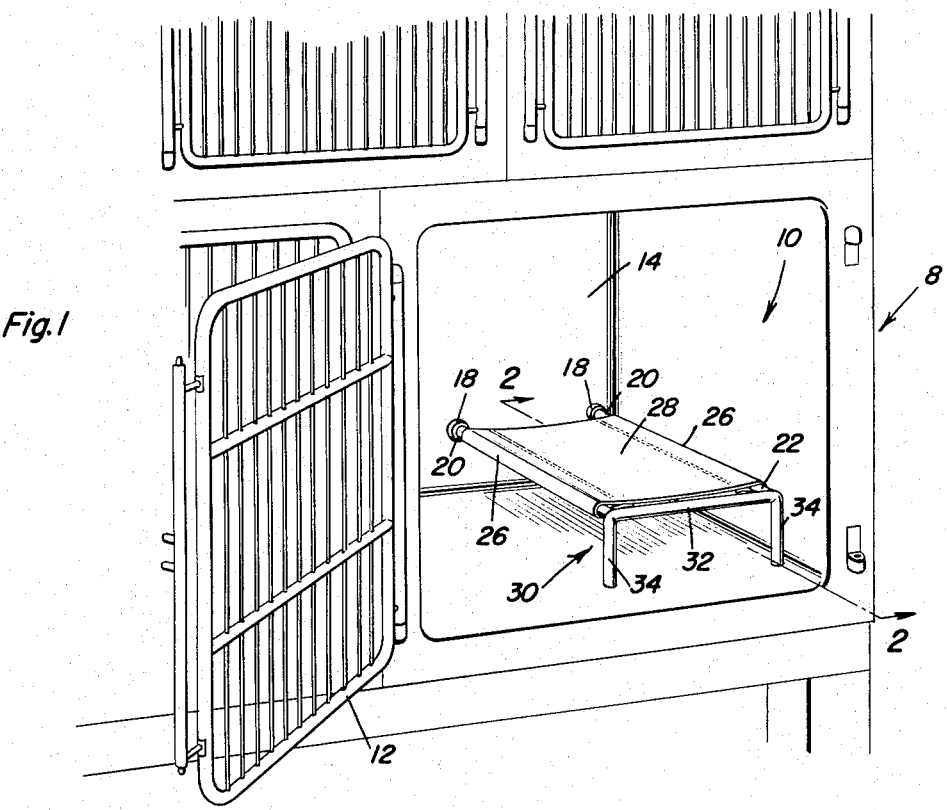
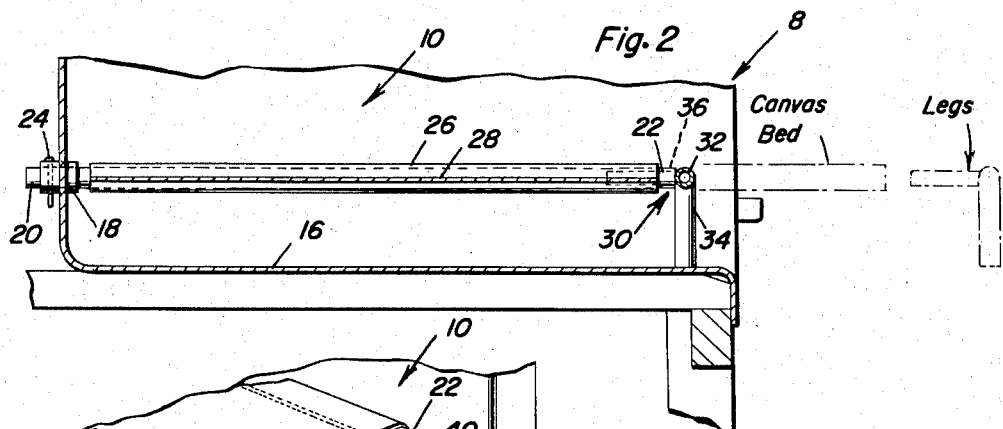
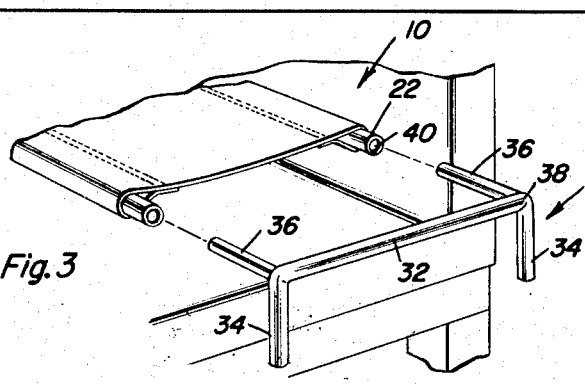
Roy D. Hoffman
INVENTOR.

Aug. 25, 1959
R. D. HOFFMAN
2,900,956
COT FOR DOG AND ANIMAL CAGES
Filed Dec. 19, 1957
2 Sheets-Sheet 2
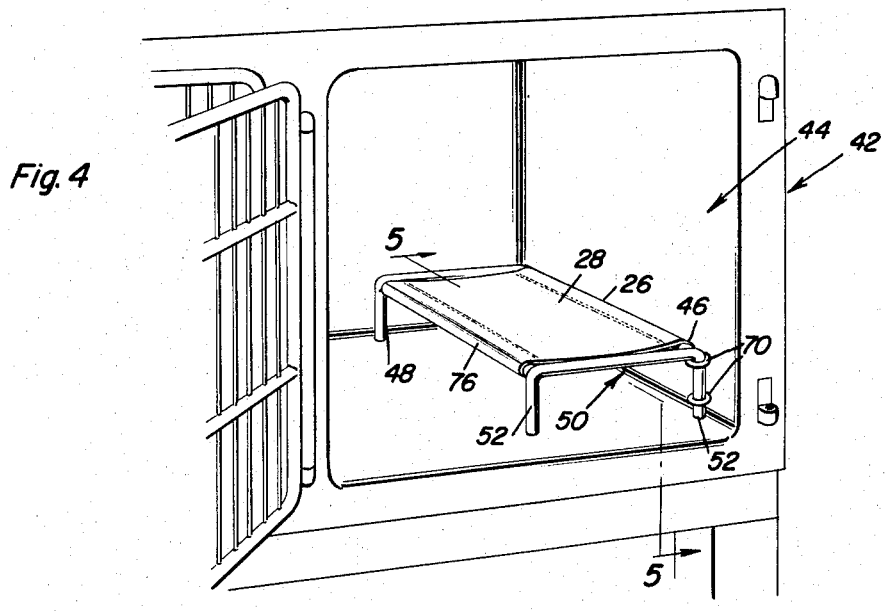
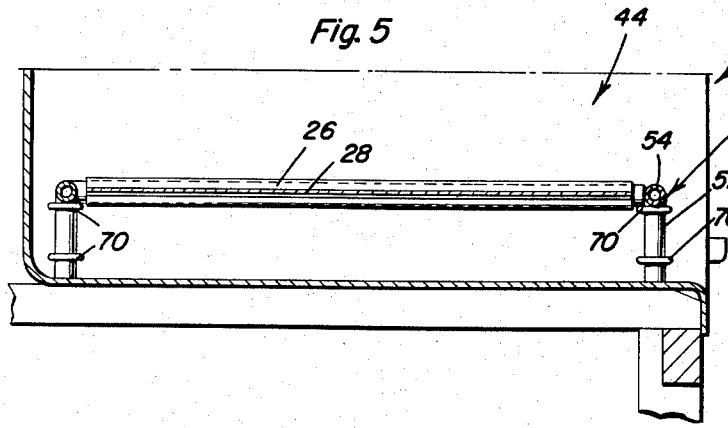
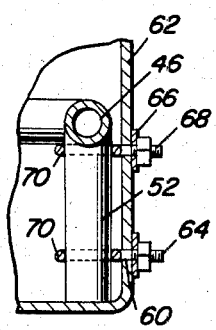
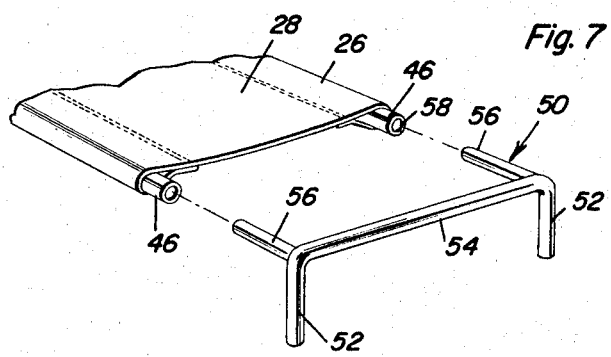
Roy D. Hoffman
INVENTOR.

United States Patent Office

2,900,956
Patented Aug. 25, 1959

2,900,956

COT FOR DOG AND ANIMAL CAGES

Roy D. Hoffman, Bedford, Pa.

Application December 19, 1957, Serial No. 703,928

6 Claims. (Cl. 119—15)

The present invention relates to animal beds generally speaking and has reference in particular to a cot which is expressly, but not necessarily, adapted to accommodate a dog and which is unique in that it is aptly and satisfactorily constructed to be used in and as a part of an animal cage.

It is a matter of common knowledge that animal cages are used singly and collectively at dog kennels and hospitals to assist in handling dogs which are being boarded, have been hospitalized for care and for other needs and purposes well-known to those who are acquainted with such practices and the Kirschner and similar cages which are currently in use. Instead of employing paper and other makeshift materials as dog beds, it is hereby and now proposed to appropriate and install a practical readily insertable and removable cot, one which is characterized by a canvas or equivalent sling and leg frames and which in effect is a miniature copy of what may be called an Army cot.

In carrying out one aspect of the concept the rear vertical wall of the space or compartment in the cage is provided with holes and these are bushed. The bushings in turn serve to accommodate end portions of tubular rods which go to make up the side rails of the cot. These rods or rails serve to permit the hems or pockets of the canvas cover or sling to be applied. Then a detachable U-shaped leg frame is fitted on the outer ends of the rods to thus aptly support the cot in a nicely usable manner.

The invention also has to do with a four-legged cot instead of a two-legged cot wherein front and rear legs are either permanent or detachable as desired. The legs on one side of the cot are anchored in anchoring eyes used on and in connection with eyebolts and the eyebolts are attached to a vertical side wall of the cage or space therein.

More significant than the above is that aspect of the over-all concept which has to do with the combination of a cot which is suitable for dogs, cats and similar pets. More particularly this aspect of the matter has to do with combined facilities which may be offered by a veterinarian and which from the humane point of view will be unquestionably endorsed by owners of animals particularly when they are being kept in a kennel after surgery or a similar operation requiring temporary confinement. This is to say, it is an objective of the invention to provide a walled enclosure wherein an appropriately constructed and performing knockdown cot is bracketed detachably to a vertical wall to facilitate ready insertion and removal of the cot. The purpose of the cot is, obviously, to provide a bed which is elevated from the floor. The frame of the cot has suitable legs resting on the floor and the entire frame can be dismantled and a water-proof canvas or equivalent cover applied and removed at will making it possible to keep the cot clean and presentable at all times.

Briefly summarized, novelty is therefore predicated on a kennel or equivalent enclosure characterized by a bottom wall providing a floor and at least one side wall, a cot having side rails, at least one end rail and legs carried thereby, said legs resting on the floor. Anchoring means is provided on the vertical wall at the desired elevation above the floor and the anchoring means constitutes the means for bracketing the frame or a rail of the frame removably on the wall to facilitate removing the cot for cleaning whenever necessary or desired. The cover means, which is launderable and washable is readily applicable and removable as already touched upon.

Other objects, features and advantages will become more readily apparent from the following description and the accompanying illustrative drawings.

In the drawings wherein like numerals are employed to designate like parts throughout the same:

Fig. 1 is a fragmentary perspective view showing a plurality of animal cages and wherein one cage, at least, is provided with the improved easy-to-install dog cot.

Fig. 2 is a section taken on the plane of the line 2—2 of Fig. 1, looking in the direction of the arrows.

Fig. 3 is a fragmentary perspective view on a slightly enlarged scale and focusing attention on the attachable and detachable front leg means.

Fig. 4 is a view similar to Fig. 1 and showing a modified cot.

Fig. 5 is a section on the line 5—5 of Fig. 4 looking in the direction of the arrows.

Fig. 6 is a fragmentary view in section and elevation showing the eyebolts and how they serve to embrace and anchor the cooperating leg.

Fig. 7 is a fragmentary perspective view of an exploded nature showing the leg frame detached.

Referring now to the drawing and first to Figs. 1 to 3 inclusive, the numeral 8 designates a single component of the cage assembly. Alternatively, this part of the over-all assemblage seen may be thought of as a single cage. In any event it is a cage of a well-known type in which the body is of walled construction and defines the animal's space or compartment 10. The openwork door, which is hingedly mounted, is denoted by the numeral 12. Insofar as the present invention is concerned only the rear vertical wall 14 comes into the picture so to speak. That is to say, and as seen in Fig. 2 a hole is provided just above the floor 16 in the manner seen in Fig. 2. In fact, there are two holes provided and a sleeve or bushing 18 is fitted in each hole. The bushing may be welded or otherwise secured in place and it serves as an anchoring bearing for the cooperating end portion 20 of one of the horizontal tubular rails or frame members 22 of the cot. A cotter pin or the like 24 may be employed and passed through the bushing and openings provided therefor in the rail to function as shown. These rails when installed will be in spaced parallelism to accommodate the hems or pockets 26 on the longitudinal edge portions of the canvas cover or sling 28. To complete the cot and to render it more rigid there is provided a detachable leg frame denoted as an entity by the numeral 30 in Fig. 3. This comprises a horizontal bight portion 32 with depending end portions 34 which constitute supporting legs. In addition there are tubular extensions 36 which project from the corner portions 38 and which fit telescopically into the sockets 40 provided by the end portions of the tubular rails 22 all in an obvious manner.

In the form of the invention seen in Fig. 4 substantially the same adaptation and arrangement prevails. Here the cage 42 has the already mentioned compartment or space 44. Instead of a two-legged cot a four-legged cot is used. This comprises a pair of spaced parallel side rails or tubes 46 having depending rigid legs 48 at what may be called the inner end. The detachable U-shaped leg frame 50 as seen in Fig. 7 embodies the front legs 52 and the connecting bight 54 carrying lateral extensions 56 fitting telescopically in the sockets 58. Thus a knockdown four-legged cot is had. It is important to note in Fig. 6 that pairs of eyebolts are employed. That is to say upper and lower holes 60 are provided in the vertical side walls 62 and the shank portions 64 of the eyebolts are passed therethrough and through washers 66 and held in place by the assembling and retaining nuts 68. The upper and lower eyes 70 are in pairs inside of the compartment and the cooperating legs of the cot are fitted slidingly down through the eyes and anchored in place.

It is submitted that the invention revealed represents an advance in the art, is simple, practical, feasible and will appeal to manufacturing requirements and economies of manufacturers. It is believed that it will meet with widespread endorsement by members of the public. However, it is not a matter of importance to dwell on the commercial aspects.

While the drawings imply that the bed is used in a single compartment or kennel it is obvious that the concept embodies the utilization of beds in one or more kennels. In fact, in the arrangement shown, for instance, in Figs. 4 to 7 instead of attaching the eyebolts to an outside wall as shown there, the eyebolts may be utilized on a party wall between adjacent kennels or compartments. It would be within the purview of the invention to extend the eyebolts so that the eyes are on both sides of the dividing or party wall. If instead of using eyebolts one desires to employ vertical tubes or other socket members such would be within the purview of the invention.

The disclosure is also intended to comprehend not only the bushing or socket arrangement seen in Fig. 2 for example but any equivalent construction wherein, for instance, the kennel wall might be provided with an integral socket that would be built in at the time of manufacture. Of importance is the common aspect of the invention wherein the front leg frame means is readily attachable and detachable. When removed the end portion of the side rails are then free to permit the hems of the sling or canvas cover to be slipped off, the cover washed and then put back in place. Any means falling within the meaning of "mechanical equivalent" may be applied to the kennel walls to accommodate the cots and to removably retain the same in place. The thought is to do the job with a minimum of alteration to existing or stock parts of kennels now on the market.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

It is also to be understood that "kennel bed" applies to any mode of installation whether in a prepared portable or equivalent kennel as used in a hospital; and also applies to a house or office where the bed would be attached to a building wall or the like.

What is claimed as new is as follows:

1. An enclosure for an animal including a side wall and a floor, a cot having side rails, at least one end rail and legs, said legs resting on the floor, anchoring means on said side wall having separable engagement with at least one of said legs, and a washable cover operatively attached to opposite side rails of said cot to form a raised bed for an animal.

2. The structure defined in claim 1, said cover being made of launderable sheet material having open-ended lengthwise hems fitted removably on their respective side rails whereby the cover may be removed, washed, and restored to its cot-forming position at the discretion of an attendant.

3. The structure defined in claim 1, and wherein said cot is of a knockdown construction so that it may be readily and bodily disconnected from said anchoring means and all parts thereof dismantled and cleaned thoroughly before being again assembled and restored to frame-forming relationship.

4. The structure defined in claim 1, and an animal cot embodying a frame having spaced parallel tubular side rails, the ends of which constitute sockets, and at least one detachable leg-frame having supporting legs to rest on the floor and also having extensions laterally disposed at their upper ends, said extensions fitting telescopically and removably into their respective sockets, said cover being made of canvas.

5. The structure defined in claim 1 and wherein said anchoring means comprises brackets removably mounted on said side wall, each bracket having a socket portion and the cooperating leg being fitted removably into the socket portion so that the leg can be inserted and removed as may be required.

6. For use in conjunction with an animal kennel which embodies a walled structure and a front with an openable and closable door; an animal elevating bed comprising a knockdown cot of a size and shape that it may be removably installed in the kennel whenever necessary or desired, said cot comprising spaced parallel tubular side rails the respective open end portions of said rails serving as sockets, a canvas sling constituting a cover and disposed in the space between the side rails and provided along opposite longitudinal edges with open ended hems providing pockets, said rails fitting removably into their respective pockets and having their end portions extending beyond the adjacent respective ends of the pockets, and leg frames which are readily connectible to or separable from said rails, each leg frame embodying legs adapted to rest on the floor of the kenel and having lateral extensions at the upper ends of said legs, said extensions adapted to fit removably into the cooperating sockets provided therefor in the cooperating side rails, and means for bracketing at least one leg to a portion of a vertical wall of the aforementioned kennel.

References Cited in the file of this patent

UNITED STATES PATENTS

| | | |
|---|---|---|
| 614,008 | King | Nov. 8, 1898 |
| 669,175 | Lein | Mar. 5, 1901 |
| 922,993 | Youngblood | May 25, 1909 |
| 1,065,422 | Youngblood | June 24, 1913 |
| 1,226,426 | Westcott et al. | May 15, 1917 |
| 1,820,284 | Mills | Aug. 25, 1931 |
| 2,009,758 | Blatchford | July 30, 1935 |
| 2,128,415 | Hills | Aug. 30, 1938 |
| 2,697,413 | Tharby | Dec. 21, 1954 |
| 2,821,165 | Wright | Jan. 28, 1958 |